US009840925B2

(12) United States Patent
Duchaine et al.

(10) Patent No.: US 9,840,925 B2
(45) Date of Patent: Dec. 12, 2017

(54) AXIAL TURBOMACHINE COMPRESSOR OUTER CASING

(75) Inventors: Georges Duchaine, Warsage (BE); Michel Philipet, Bassenge (BE)

(73) Assignee: Techspace Aero S.A. (BE)

( * ) Notice: Subject to any disclaimer, the term of this patent is extended or adjusted under 35 U.S.C. 154(b) by 936 days.

(21) Appl. No.: 13/813,681

(22) PCT Filed: Jul. 27, 2011

(86) PCT No.: PCT/EP2011/062944
§ 371 (c)(1),
(2), (4) Date: Feb. 1, 2013

(87) PCT Pub. No.: WO2012/019915
PCT Pub. Date: Feb. 16, 2012

(65) Prior Publication Data
US 2013/0129494 A1    May 23, 2013

(30) Foreign Application Priority Data

Aug. 11, 2010    (EP) ..................................... 10172542

(51) Int. Cl.
*F01D 9/04*    (2006.01)
*F01D 11/12*    (2006.01)
(Continued)

(52) U.S. Cl.
CPC .............. *F01D 9/041* (2013.01); *B23P 15/00* (2013.01); *F01D 11/122* (2013.01); *F01D 25/24* (2013.01);
(Continued)

(58) Field of Classification Search
CPC .......... F01D 9/041; F01D 9/047; F01D 11/08; F01D 11/122; F01D 11/125; F01D 25/24;
(Continued)

(56) References Cited

U.S. PATENT DOCUMENTS 3,770,560 A * 11/1973 Elder .................... E01F 8/0076
                                                              181/286
4,063,847 A * 12/1977 Simmons ................ F01D 25/24
                                                              415/185
(Continued)

FOREIGN PATENT DOCUMENTS

| EP | 1004750 A2 | 5/2000 |
| EP | 2116695 A2 | 11/2009 |
| GB | 2442112 A | 3/2008 |

OTHER PUBLICATIONS

Hendricks (NASATM-2005-213633—Apr. 2005—Turbomachine Interface Sealing).*
(Continued)

*Primary Examiner* — Gregory Anderson
*Assistant Examiner* — Juan G Flores
(74) *Attorney, Agent, or Firm* — Polster Lieder

(57) ABSTRACT

The invention relates to a casing, particularly of an axial turbomachine compressor. This casing comprises a support of cylindrical overall shape made of composite material, a metal ring fitted by bonding to the internal surface of the support, and a layer of abradable material fitted by plasma spray onto the internal surface of the metal ring. The metal ring is preferably made of stainless steel and is preferably perforated. The perforation allows better keying of the adhesive and allows the degassing thereof. The external surface of the metal ring is preferably sandblasted prior to bonding. Its internal surface is also preferably sandblasted prior to the plasma spraying of the abradable material.

10 Claims, 3 Drawing Sheets

(51) Int. Cl.
  *F04D 29/02* (2006.01)
  *F04D 29/16* (2006.01)
  *F04D 29/52* (2006.01)
  *B23P 15/00* (2006.01)
  *F01D 25/24* (2006.01)
  *F04D 19/00* (2006.01)

(52) U.S. Cl.
  CPC ........... *F04D 19/00* (2013.01); *F04D 29/023* (2013.01); *F04D 29/164* (2013.01); *F04D 29/522* (2013.01); *F04D 29/526* (2013.01); *F05D 2230/312* (2013.01); *F05D 2260/95* (2013.01); *F05D 2300/437* (2013.01); *F05D 2300/603* (2013.01); *F05D 2300/611* (2013.01); *Y02T 50/67* (2013.01); *Y02T 50/672* (2013.01); *Y10T 29/49229* (2015.01)

(58) Field of Classification Search
  CPC ........... F05D 2230/312; F05D 2240/11; F05D 2240/14
  See application file for complete search history.

(56) References Cited

U.S. PATENT DOCUMENTS

| | | | |
|---|---|---|---|
| 4,329,308 A | | 5/1982 | Langer et al. |
| 4,639,388 A | * | 1/1987 | Ainsworth ............ B32B 15/04 228/120 |
| 6,637,186 B1 | * | 10/2003 | Van Duyn ............... F01D 11/12 415/9 |
| 6,681,692 B2 | * | 1/2004 | Beran ................... B05C 11/045 101/157 |
| 2005/0201860 A1 | | 9/2005 | Care |
| 2009/0277153 A1 | | 11/2009 | Harper et al. |
| 2010/0111675 A1 | | 5/2010 | Wojtyczka et al. |
| 2011/0052383 A1 | * | 3/2011 | Lussier ................ F01D 21/045 415/200 |

OTHER PUBLICATIONS

International Search Report from corresponding International Application No. PCT/EP2011/062944, dated Oct. 24, 2011 (English Translation included).

* cited by examiner

AXIAL TURBOMACHINE COMPRESSOR OUTER CASING

CROSS-REFERENCE TO RELATED APPLICATIONS

The present invention is the US national stage under 35 U.S.C. §371 of International Application No. PCT/EP2011/062944, which was filed on Jul. 27, 2011 and which claims the priority of application EP 10172542.2 filed on Aug. 11, 2010 the content of which (text, drawings and claims) is incorporated here by reference in its entirety.

FIELD

The invention relates to an outer shell of an axial turbomachine having a layer of abradable material intended to provide a rotating seal, particularly for an outer shell of an axial turbomachine compressor. The invention also relates to an axial turbomachine compressor fitted with such a shell. The invention also relates to a method of manufacturing such a shell.

BACKGROUND

It should be noted that the adjective "abradable" is commonly used to refer to a friable material capable of providing a certain degree of sealing against a surface moving relative to the material. This material can be constituted, formed or structured in a variety of ways. For example, an outer shell of an axial turbomachine compressor, fitted with a layer of this material ensures a rotating seal with the tips of the rotor blades of the compressor. This enables the gas-tightness of the whole to be maintained, despite any distortions, however slight, inherent in the turbomachine, particularly any deformation due to elongation of the blades resulting from centrifugal forces. By minimizing the clearance between the moving blades and the housing of the fluid stream, the effectiveness and efficiency of the turbojet is increased.

The use of composite materials, particularly those with organic matrices, is developing and growing, particularly for axial turbomachine compressors in aircraft engines. The use of such materials, especially as part of the outer shell brings new constraints.

Patent US2009/0277153 A1 discloses a stator of a gas turbine engine having a composite filling supporting a layer of abradable material. The role of this layer of abradable material is to line the inner surface of the stator housing of the engine in question to make frictional contact with the tips of the rotating blades. The inside of the housing is lined with a layer of composite cellular material designed to absorb potential impacts from ice or blade fragments in the event of a "fan blade-off." The lining is coated with a layer of abradable material via an intermediate wall. This intermediate wall has a series of perforations with diameters greater than 1 mm. It is glued to the composite lining and is preferentially made of polyester reinforced with glass fibers. The layer of abradable material is fixed to the intermediate wall using an adhesive keying into the perforations. These perforations allow degassing to occur, particularly towards the cells of the composite lining, and enable a mechanical bond between the layer of abradable material and the intermediate wall.

In summary US Patent 2009/0277153A1 proposes a method of fixing an abradable material to a cellular support. The scope of this solution is therefore severely limited.

U.S. Pat. No. 4,329,308 discloses a metal ring with the edges having a cross section in the shape of a "U", the hollow part being filled with an abradable material. This abradable material is formed by moulding it in the ring or is preformed and then placed in the ring. The abradable layer is then pressed against a toothed wheel in order to form cavities prior to being baked. As in the previous interpretation, the abradable material is made of a preformed polymer. It is stated in this patent that this ring can be inserted into a stator housing or form part of it. The method of fixing the ring to the stator is, however, not defined.

The solution proposed by this interpretation requires a particular method of producing and fixing the abradable layer. Furthermore, the proposed solution does not address the fixing of the ring to the housing.

U.S. Pat. No. 4,867,639 discloses an abradable layer including a honeycomb metallic structure and a ceramic component. The honeycomb-shaped structure is brazed directly onto the inner wall of the stator or, alternatively, onto a support attached to the stator wall. This abradable layer is more robust, and particularly more temperature-resistant than the abradable polymer of the above interpretations. However, as in previous interpretations, the abradable layer, due to its very nature, is put in place before fixing the support. In addition, the relatively substantial support is fixed into the housing with a mechanical joint, which is not compatible with a housing made of a composite material.

Beyond the interpretations of previous patents, high-performance abradable layers are nowadays deposited on metal shells using plasma spraying, especially in low pressure compressors. These abradable materials contain a metallic component that brings problems of retention when applied directly onto a composite support due to the significant difference in the coefficients of expansion of the metal and the composite and due to the fragile nature of the interface.

SUMMARY

The invention provides a shell fitted with an abradable layer and a method for manufacturing such a shell overcoming at least one the problems mentioned above. More particularly, the invention provides a composite shell having an abradable layer deposited by plasma spraying and a simple and efficient method of manufacturing such a shell, providing a way of reducing the mass of the compressor.

The invention consists of a shell of an axial turbomachine, including: a generally annular or cylindrical support with a generally circular inner surface; a ring with an inner surface and an outer surface opposite to the inner surface attached to the inner surface of the support; a layer of abradable material attached to the inner surface of the ring; wherein the support is made of an organic matrix composite material; and the ring is made of a metallic material.

The support and/or the ring can be generally cylindrical but with, however, a (slight) inherent taper inherent to the shape of a compressor housing of an axial turbomachine. The support is preferably a structural element ensuring the rigidity of the turbomachine.

The ring can be closed, open, or be composed of several segments, the segments then being placed successively on the support so as to form a ring.

Preferably, the metal ring is perforated or structured.

Although the use of composite materials for reducing weight is generally known, the idea of using an intermediate metal ring with thermal expansion characteristics matched to the composite support wall and the abradable layer is no less noteworthy. In the interpretation of US 2009/0277153 A1, the structural part of the body, namely the housing wall, is made of metallic material. An intermediate perforated layer made of a composite is used between the composite abradable layer and an intermediate cellular layer of metal. In the invention described herein, the use of a metal ring creates a less abrupt transition between the coefficients of thermal expansion of the composite shell and the abradable material to ensure the mechanical strength of the abradable layer. It also enables a high performance abradable material to be applied by plasma spraying. In addition, this metal ring also acts as a protective layer for the composite support. The presence of a metallic material compensates for the typical lack of ductility of a composite material and protects the composite support from severe mechanical stresses such as erosion or the behavior of the blades caused by an incident such as the loss of a fan blade. This protective layer is also advantageous for the reparability of parts. The composite part of the shell is protected when removing the abradable layer by known methods such as sand blasting or water jetting.

According to a first embodiment of the invention, the ring comprises a series of perforations distributed over its surface. The perforations are distributed generally uniformly and/or regularly over the surface of the ring, preferably over the entire surface of the ring. The perforations are generally circular and have a diameter less than or equal to 1 mm, preferably less than or equal to 0.6 mm. The ring can be composed of several hoops of metallic strip. The perforations enable not only degassing of the adhesive but also better mechanical bonding.

According to a second embodiment of the invention, the ring is made of a wire mesh.

Preferably, the metallic material of the ring is comprised of the following materials: stainless steel, titanium, nickel-iron alloy, invar (Fe—Ni 36%).

According to a third embodiment of the invention, the ring is made of porous material, preferably metallic foam, more preferably nickel foam.

Preferably, for the three embodiments described above, the ring segments are made of strips with a thickness of between 0.1 mm and 1 mm, preferably between 0.15 and 0.5 mm, more preferably between 0.15 mm and 0.3 mm.

Preferably, for the three embodiments described above, the shell includes an adhesive layer placed between the support and the ring ensuring their bonding.

Preferably, the adhesive layer is in direct contact with the support surface and the corresponding surface of the ring.

Preferably, for the three embodiments described above, the abradable layer comprises an abradable material with a metal component, sprayed on using a plasma.

Preferably, for the three embodiments described above, the abradable layer comprises an AlSi polyester abradable material, sprayed on using a plasma.

Preferably, the abradable layer is applied directly to the ring, preferably by spraying.

According to yet another advantageous embodiment of the invention, the support comprises a structural section of a compressor housing of the turbomachine, the section preferably corresponding to at least one row of stator blades and one row of rotor blades of the compressor.

The invention also consists of an axial turbomachine compressor comprising a rotor fitted with blades, so-called rotor blade rows, a housing with blades, so-called stator blade rows, wherein the housing includes a shell or an assembly with at least one of the shells as defined above, the shell being part of the housing with an abradable layer providing a seal with the tips of the rotor blades.

The invention also consists of a method of manufacturing a shell of an axial turbomachine, preferably an axial turbomachine compressor, comprising the following steps:

a) providing a support of a composite material with an organic matrix generally ring-shaped or cylindrical with a generally circular inner surface;

b) fixing a metal ring onto the support, the ring having an inner surface and an outer surface opposite to the inner surface and preferably fixed by gluing on the inner surface of the support;

c) applying a layer of abradable material on the inner surface of the ring.

According to an advantageous embodiment of the invention, step c) is performed by plasma spraying, the abradable material being preferably of AlSi polyester.

According to another advantageous embodiment of the invention, the method includes a step carried out prior to step c) of preparing the surface of the ring opposite to the surface fixed to the support either by sandblasting or chemical etching.

One can also consider another embodiment process of the present invention. The ring can be made up of several sections that can be joined by co-moulding during the manufacture of the composite outer shell.

FIGURES

DETAILED DESCRIPTION

In the following description, the terms "internal" and "external" used to describe the surfaces of the support and the ring relate to the envelope formed by the support and/or the ring; "internal" then means inside that envelope, and "external" means outside that envelope.

Note that the term "external" for the shell refers, in contrast, to the generally annular fluid stream, "outer shell" denotes a shell on the side of the outer edge or outer surface the fluid stream, and "inner shell" designates a shell on the side of the inner edge or inner surface of the fluid stream.

Figure 1:
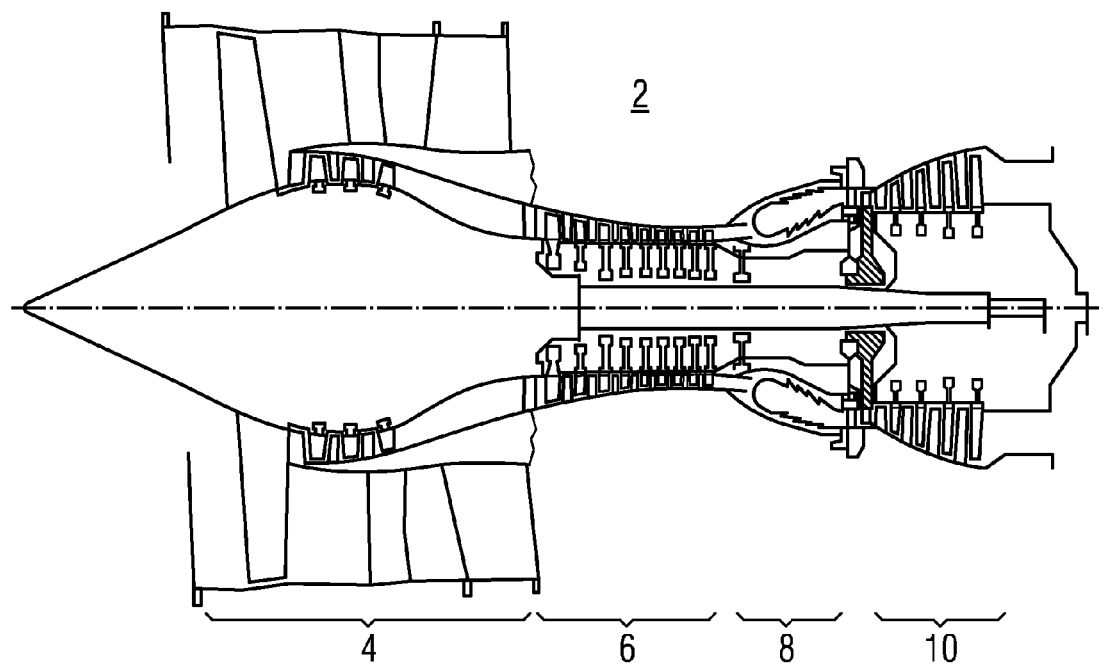
FIG. 1 is a schematic sectional view of a dual rotor axial flow turbofan, the type of aircraft engine whose low-pressure and/or high pressure compressor is likely to be equipped with an external and/or internal shell described in the invention.

The axial turbomachine 2 shown in FIG. 1 is a double-flow turbofan jet aircraft engine. The turbomachine 2 comprises, from upstream to downstream, a low-pressure compressor 4, a high-pressure compressor 6, a combustion chamber 8 and a turbine 10. The low-pressure and high-pressure compressors are not subject to the high temperatures to which the turbine is subjected. It is therefore possible to use organic matrix composite materials for the production of various components of these compressors, such as the outer shell of the stator.

Figure 2:
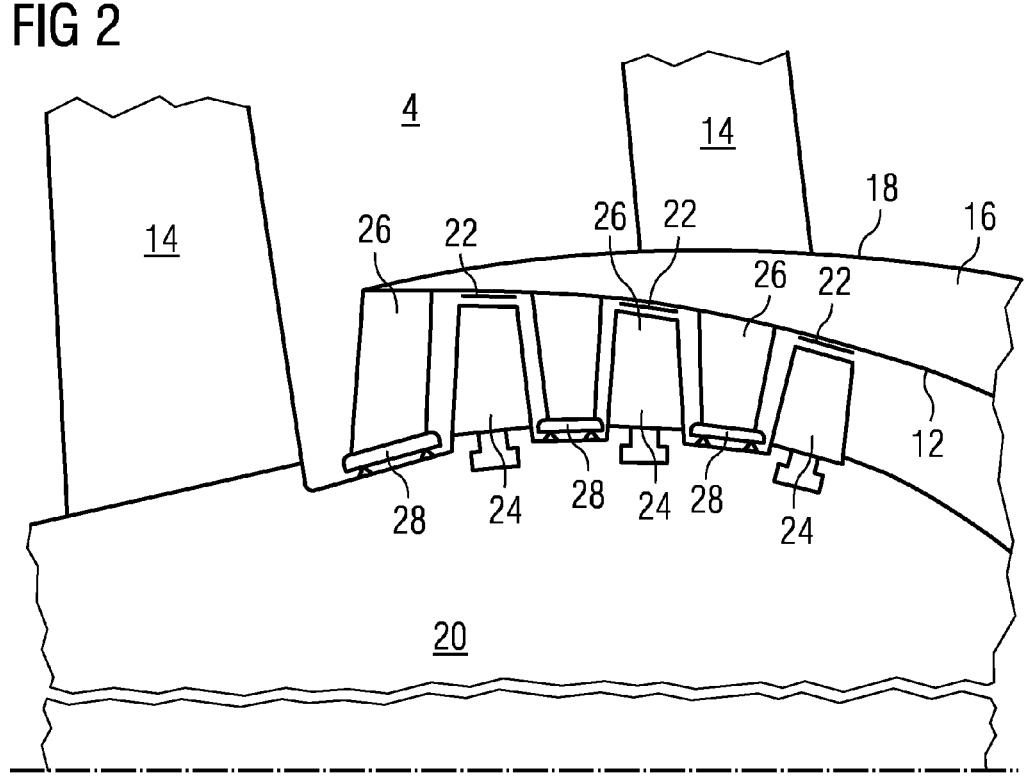
FIG. 2 is a partial sectional view of the low-pressure compressor of the engine of FIG. 1, the low-pressure compressor being fitted with the shells described in the invention.

The low-pressure compressor 4 in FIG. 1 is shown in FIG. 2. As shown in FIG. 2, the low-pressure compressor 4 includes a rotor 20 carrying a plurality of the so-called rotor blade rows 24, a stator formed of a housing 12 and a wall 16 defining the secondary airflow. The housing 12 supports a series of fixed blades 26, so-called stator blade rows. Each circumferential row of stator blades 26 forms a stator stage. Each circumferential row of stator blades 26 together with a circumferential array of rotor blades 24 constitute a compression stage that functions to increase the pressure of the fluid, in this case air, passing through the compression stage. Since the pressure gradient is in a generally axial direction, it is necessary to provide sealing means between the rotating and the stationary parts along the fluid stream. A layer of abradable material 22 is positioned in relation to the tips of each row of rotor blades 24 so as to provide a certain degree of contact in order to ensure a seal.

Figure 3:
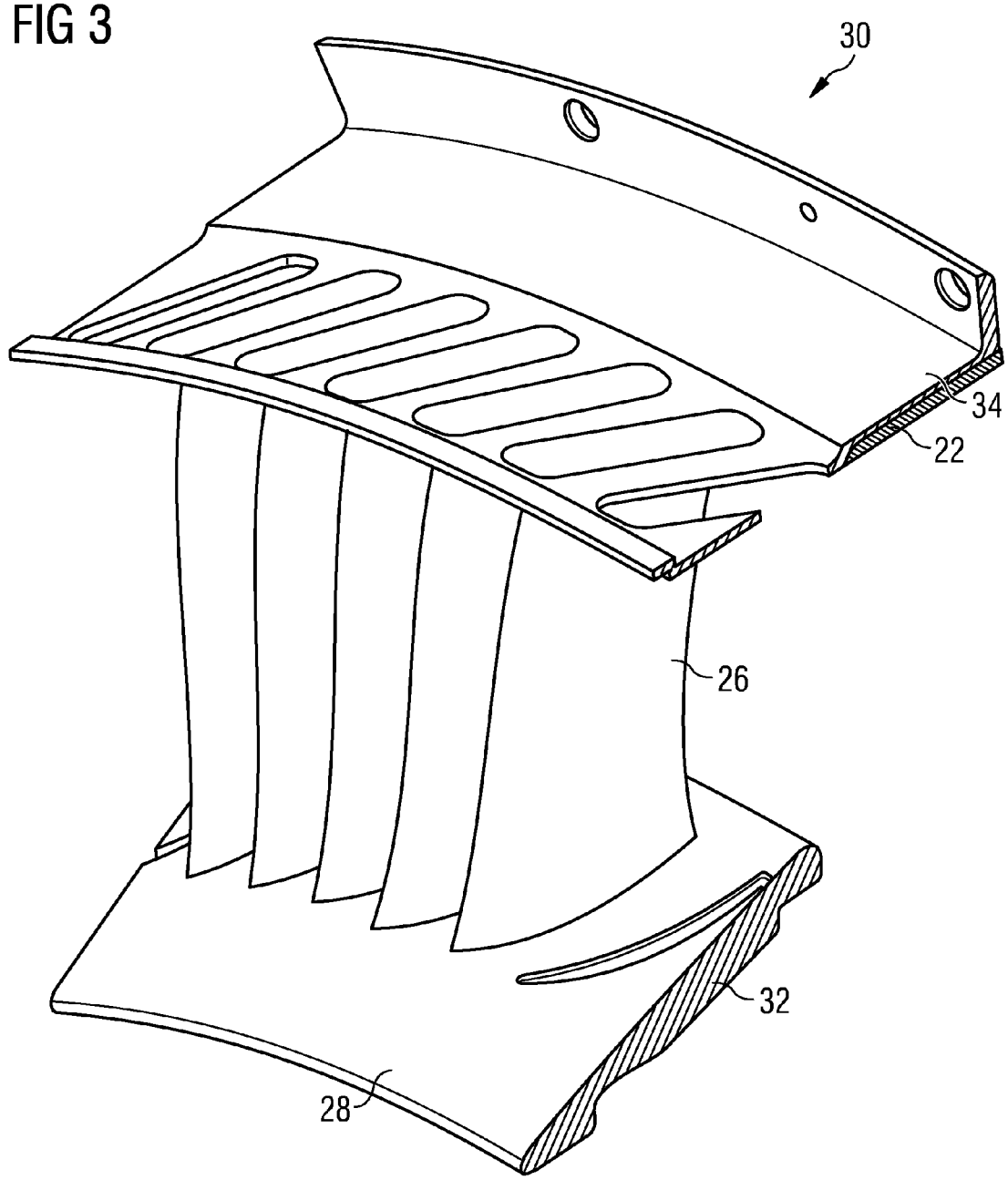
FIG. 3 is a perspective view of a compressor stator stage, comprising a shell according to the invention.

FIG. 3 illustrates a segment 30 of the stator housing 12 in FIG. 2, segment 30 corresponding to a compression stage. The housing section 30 comprises a generally cylindrical wall 34 carrying a row of stator blades 26 and a layer of abradable material 22 directly downstream of the stator blades 26 positioned facing the tips of the rotor blades 24 directly adjacent downstream.

Figure 4:
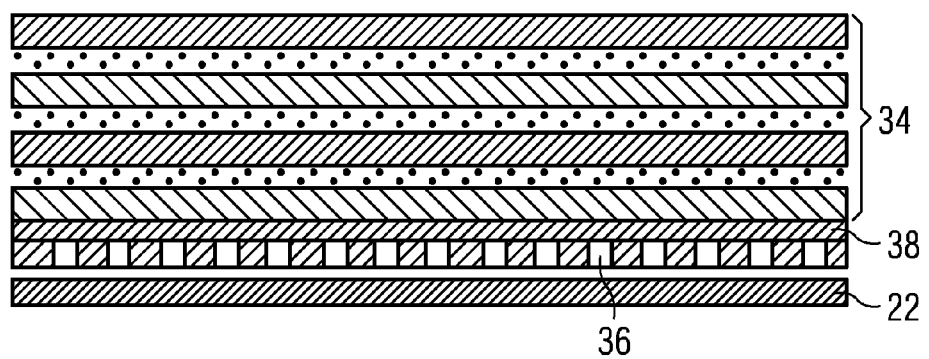
FIG. 4 is a sectional view of the shell of FIG. 3.

The structure of the wall 34 forming the support and the layer of abradable material 22 of the wall is shown in FIG. 4. This is a sectional view. Note that this construction is illustrated and described in relation to the wall 34 of the housing forming a so-called outer shell.

The wall 34 forming the shell support is a composite material with an organic matrix, such as carbon fibers coated with an epoxy resin made using resin transfer moulding (RTM)—injecting pressurized resin into a closed mould containing a preformed or compacted reinforcement. When the resin is cured, the mould can be opened and the composite removed.

A metallic strip 36 in the form of a generally cylindrical ring is pressed against the inner surface of the wall 34 by means of an adhesive layer 38. The strip 36 can consist of a single piece forming a complete ring or several segments. The strip 36 is perforated to allow optimum mechanical bonding of the adhesive. The perforations also allow degassing of the adhesive after application, also providing improved malleability when fixing.

This arrangement of the materials also reduces crack propagation.

The adhesive or glue can be epoxy-based, for example. It can be applied as a film, for example on the outer face of the metallic strip.

The abradable layer 22 is attached to the inner surface of the metallic strip 36. An abradable material is one having characteristics of abradability, ensuring that the rotor tips remain undamaged when in contact with the material. More particularly, an abradable material can consist of three main components:

- a component which ensures structural rigidity of the coating and corrosion resistance,
- a non-structural component to lubricate the contact portion of the blade tip (this component is sometimes called a solid lubricant),
- porosities that allow the coating particles to detach easily on contact.

In various embodiments, the abradable material 22 can be comprised essentially of a heterogeneous material with a metallic phase, deposited by thermal spraying, especially by plasma spraying. This material can be of AlSi polyester.

The plasma spraying technique is a metallurgical powder manufacturing technique that is used in the creation of a large number of high abradability materials. The plasma is generated by applying a large potential difference between concentric electrodes at a high DC current. This ionizes an inert gas (nitrogen, argon, helium) making it reach a high pressure and an extremely high temperature (more than 16,000° C. at a current of 1,000 A). A stream of powder stream is then injected into the plasma jet. This technique allows any metal to be fused, even the most refractory, because of the high temperature reached.

In various embodiments, to ensure optimal bonding of the abradable material 22, sandblasting the inner surface of the metallic strip 36 is employed.

The perforations in the strip 36 are ideally distributed over its entire surface so as to ensure homogeneous bonding. The strip 36 is relatively thin, for example between 0.1 mm and 1 mm, preferably about 0.2 mm. The strip 36 can be of stainless steel such as grade 316L. Or, the strip 36 can equally be of titanium or Invar® (an alloy of iron (64%) and nickel (36%) with a low carbon and chromium content, whose main property is having a very low coefficient expansion). Alternatively, the strip 36 can be a wire mesh or foam such as a nickel or nickel-chromium foam.

Figure 5:
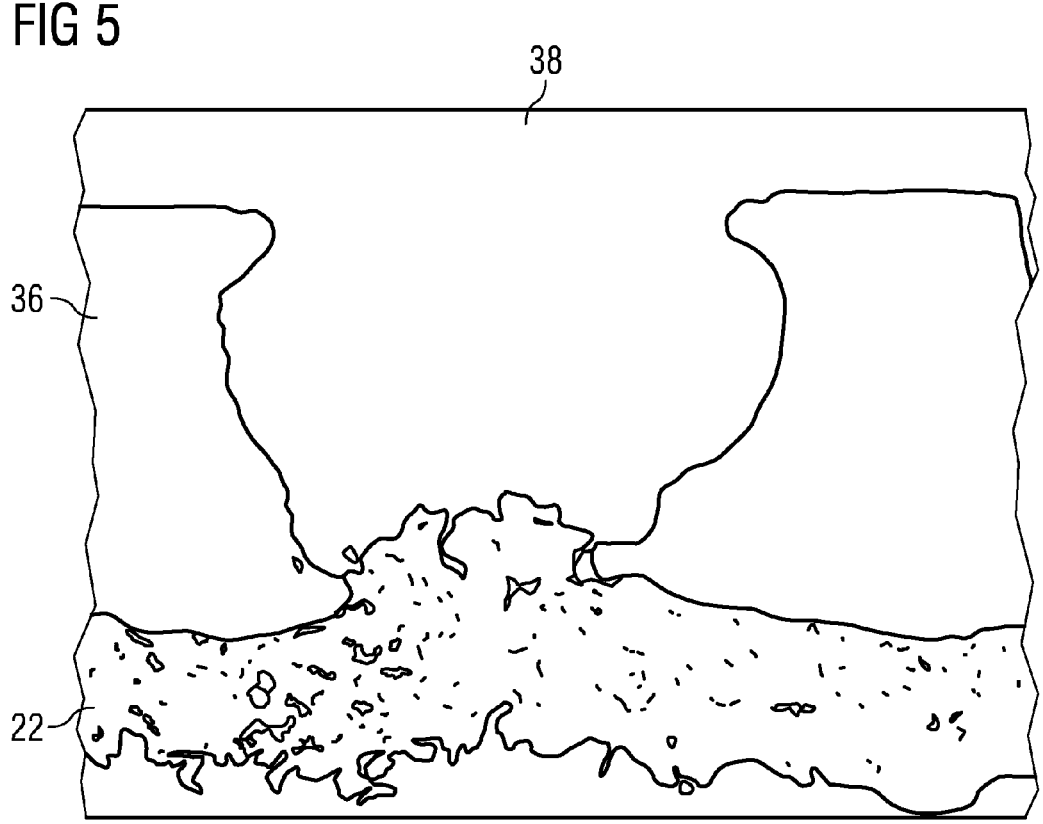
FIG. 5 is a greatly enlarged view of the shell in FIG. 4, illustrating the role of one of the perforations in the metal ring.

Preferably, the outer surface of the metallic strip 36, that is to say the surface that will be bonded to the structural composite wall 34 of the shell can be sandblasted prior to application. This sandblasting has the effect of partially closing the perforations, allowing greater mechanical bonding. This effect is illustrated in FIG. 5 which is a greatly enlarged view of a perforation in the ring, i.e., the metal strip 36, the glue and the abradable layer 22. FIG. 5 illustrates well the mushroom shape of the adhesive 38 in one of the perforations of the metallic strip 36. This effect is also true for the other side of the strip 36, i.e. the side that will attach to the abradable layer 22.

The invention claimed is:

1. A method of manufacturing a shell of a compressor of an axial turbomachine, said method comprising the following steps:
   providing a support of a composite material with an organic matrix having one of a generally ring-shaped and a generally cylindrical shape with a generally circular inner surface, the support being a structural element ensuring rigidity of the turbomachine;
   fixing a metal ring on the support, the ring being a strip comprising a series of perforations distributed over its surface and having an inner surface and an outer surface opposite to the inner surface wherein the metal ring is fixed on the support by gluing the metal ring on an inner surface of the support; and
   applying an abradable layer on the inner surface of the ring.

2. The method of manufacturing the shell of a compressor of an axial turbomachine according to claim 1, wherein applying the abradable layer on the inner surface of the ring is performed by plasma spraying, and wherein the abradable material comprises AlSi polyester.

3. The method of manufacturing the shell of an axial turbomachine according to claim 1 further comprising a step of preparing the inner surface of the ring by one of sandblasting and chemical etching prior to applying the abradable layer on the inner surface of the ring.

4. The method of manufacturing the shell of a compressor of an axial turbomachine according to claim 1, wherein the perforations have a diameter that is one of less than 1 mm and equal to 1 mm.

5. The method of manufacturing the shell of a compressor of an axial turbomachine according to claim 1, wherein the ring comprises a wire mesh.

6. The method of manufacturing the shell of a compressor of an axial turbomachine according to claim 1, wherein the metallic material of the ring is comprised of at least one of stainless steel, titanium, nickel-iron alloy and FeNi36.

7. The method of manufacturing the shell of a compressor of an axial turbomachine according to claim 1, wherein the ring is made of a porous material.

8. The method of manufacturing the shell of a compressor of an axial turbomachine according to claim 1, wherein the ring has a thickness between 0.1 mm and 1 mm.

9. The method of manufacturing the shell of a compressor of an axial turbomachine according to claim 1, wherein the ring is made of a plurality of segments.

10. The method of manufacturing the shell of a compressor of an axial turbomachine according to claim 1, wherein the adhesive layer is in direct contact with the inner surface of the support and the outer surface of the ring.

* * * * *

UNITED STATES PATENT AND TRADEMARK OFFICE
CERTIFICATE OF CORRECTION

PATENT NO. : 9,840,925 B2
APPLICATION NO. : 13/813681
DATED : December 12, 2017
INVENTOR(S) : Georges Duchaine and Michel Philippet It is certified that error appears in the above-identified patent and that said Letters Patent is hereby corrected as shown below:

On the Title Page

At (73) Assignee: replace "Techspace Aero S.A. (BE)" with --Safran Aero Boosters SA (BE)--

Signed and Sealed this
Twentieth Day of November, 2018

Andrei Iancu
*Director of the United States Patent and Trademark Office*